Jan. 5, 1971               A. V. WEASLER ET AL                3,552,806
              FULL RECIRCULATING LINEAR BALL BEARINGS WITH
              SHAFT TELESCOPING WHILE TRANSMITTING TORQUE
                        Filed Nov. 8, 1968
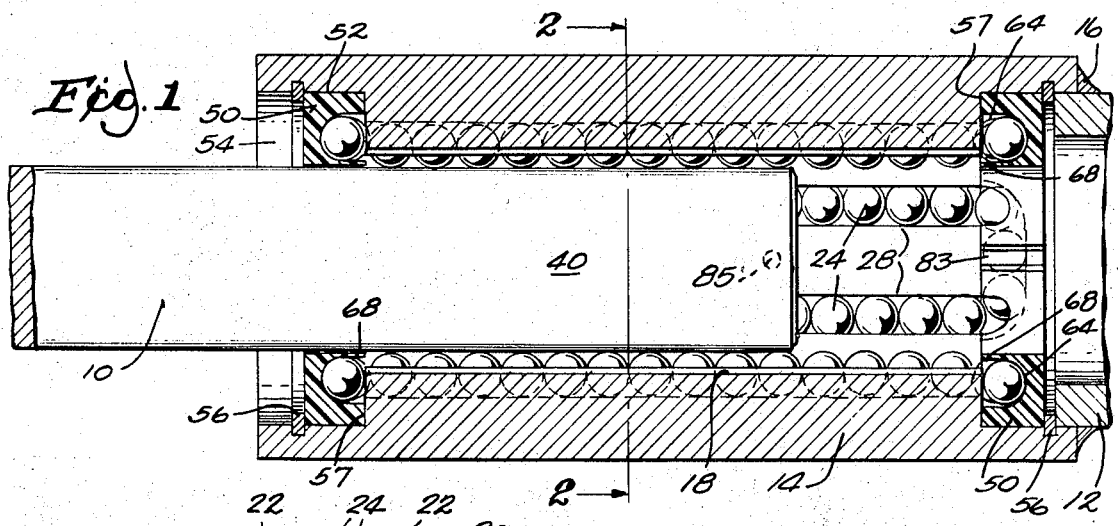
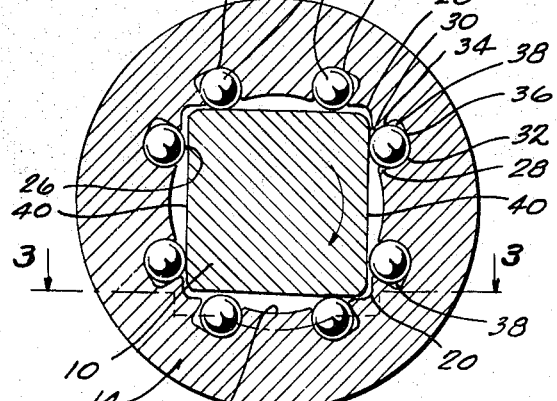
Fig. 2
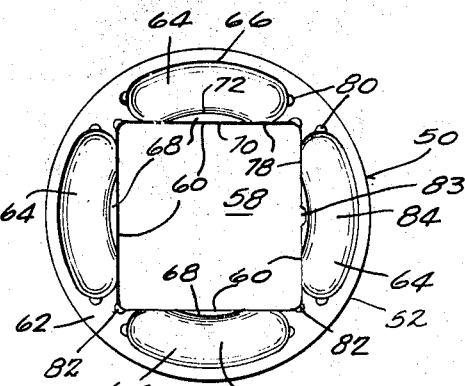
Fig. 4
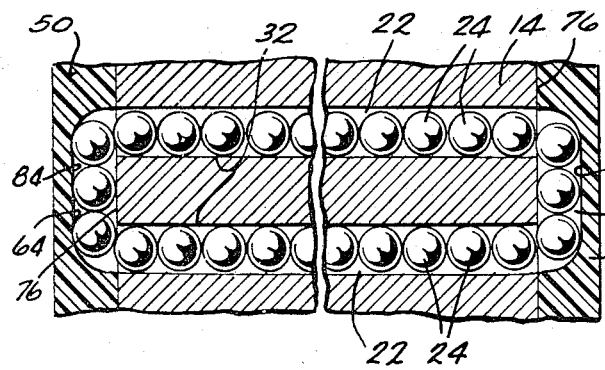
Fig. 3
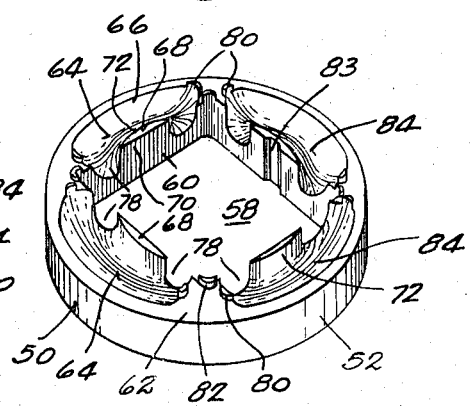
Fig. 5
INVENTORS
ANTHONY V. WEASLER
BENNETT B. REAK
BY Wheeler, Wheeler, House & Clemency
                ATTORNEYS

United States Patent Office 3,552,806
Patented Jan. 5, 1971

3,552,806
FULL RECIRCULATING LINEAR BALL BEARINGS WITH SHAFT TELESCOPING WHILE TRANSMITTING TORQUE
Anthony V. Weasler and Bennett B. Reak, West Bend, Wis., assignors to Weasler Engineering & Mfg. Co., Inc., West Bend, Wis., a corporation of Wisconsin
Filed Nov. 8, 1968, Ser. No. 774,386
Int. Cl. F16c 29/06
U.S. Cl. 308—6
11 Claims

ABSTRACT OF THE DISCLOSURE

The inner member of the telescopic shaft has true rectilinear ball races ground after heat treating. Opposite each of said surfaces the outer member has two channels in which balls are confined and can move freely. These channels have narrow slots through which portions of the balls are exposed to contact the inner member. The arrangement confines the balls against escape from the channels when the inner member is withdrawn from the outer member. End caps provide transfer passages from one channel to the other so that the circulation is in a closed path. Split rings anchor the end caps in the outer member and prongs integral with the end caps interlock the end caps with the sleeve-like outer member and the inner member is also keyed to maintain the assembly in proper orientation.

BACKGROUND OF INVENTION

In most telescopic shafts having recirculating ball bearings, the ball races are disposed in part opposite one face of the inner member and in part opposite a different face thereof. In some such shafts, the return channel is provided behind the channel in which the balls function. This, obviously, is an expensive construction. In many cases, the balls fall from the races in the event the inner and outer members are separated. In at least one instance the edges of the ball race channel have been swaged to confine the balls, as distinguished from the present arrangement in which the respective channels are broached to provide the narrow slot in which the surfaces of the balls are exposed, but through which they cannot escape.

In the few telescopic shaft structures having circulating ball races opposite respective faces of an inner member of polygonal cross section, the mechanical structure includes separately fabricated dividers between ball races or curved communicating channels requiring special machining, or other complex and expensive details.

It is an object of the present invention to provide a telescopic shaft with an inner member of polygonal cross section in which each circulating system is nearly entirely in one plane and is complete opposite a particular face parallel to this plane, this being achieved by machining operations which are nearly all rectilinear, and by specially prefabricated end caps to transfer the balls from one race to another while removing them outwardly from contact with the particular shaft face with which the balls in the circulatory system are engaged while in the faces of the shaft.

SUMMARY OF INVENTION

An inner member preferably of polygonal cross section is reciprocable through an outer member which, in practice, comprises a sleeve that may be prefabricated and welded to the end of a tubular shaft section on a part thereof. The sleeve has a central bore which need not be arcuate in cross section but is broached or otherwise machined axially of the sleeve to provide, in effect, a polygonal cross section with surfaces intersecting the side of the bore and projecting beyond it at the corners to provide clearance for the polygonal inner shaft member.

Opposite each face of the inner shaft member the sleeve is provided with broached channels with un-worked margins which confine the balls so that only small arcuate portions of their peripheries are exposed to engage the associated face of the inner member. These race channels are not necessarily truly circular in cross section but desirably have one flat side which is tangent to the respective balls and extends outwardly to provide an axially extending recess of small cross section paralleling the ball race.

The structure is duplicated allochirally and the arrangement is such that on each face of the inner shaft member the races comprise paired ball channels proximate each other. Between these channels are recesses at the corners of the broached passage through which the inner shaft member reciprocates, the size of these recesses being augmented by slight rounding of the respective corners of the inner shaft member.

The exposed faces of the balls engage true rectilinear surfaces desirably ground parallel in a final operation after heat treating and straightening.

There is a very slight clearance which facilitates the free rolling movement of the balls even when the telescopic shaft members are operating under heavy torque. The torque causes the race surfaces of one member to engage only the balls in the directly opposing rectilinear race, leaving the balls in the return race free of pressure for substantially resistant-free movement around the circuit to the race in which the balls are functioning under torque.

The end caps above mentioned may be cast of synthetic resin (they may also be made otherwise) and each is provided with a polygonal opening complementary to the opening in the sleeve. Adjacent this opening at each corner thereof the end cap has projecting prongs (three shown) to be received into the adjacent recesses provided by the sleeve as above described. These prongs dowel the respective end caps to the sleeve to maintain proper orientation. At least one end cap has a notch engaged by a pin in the inner shaft member so that the parts can only be assembled in proper orientation. This is important in a device like that herein disclosed in which the inner shaft member is freely removable from the female shaft member. Unless the parts can readily be reassembled in proper relative position, the universal joint parts or other mechanisms with which the shaft members are connected might not be properly oriented.

Mention has been made of the fact that the sleeve comprising the outer shaft member has an inner surface which is in part complementary to the flat face of the inner shaft member and, as shown, is in part arcuate in cross section. This passage is herein called a bore regardless of its cross section or mode of manufacture. Each end cap is provided opposite each face of the inner member wtih a channel for transferring balls from one race to another while, at the same time, the channel is arcuately convex away from the face of the inner member on which the balls roll. This carries the balls out of contact with the corresponding face of the inner member during the period of transfer from one race into the other. To guide the balls about this outwardly arcuate path, the inner face of the end cap channel is made up of an axially extending guide tongue which is substantially planiform on its inner face and convex on its outer face.

Manufacture is simplified by the fact that such machining operations as the broaching are conducted axially and are limited to the sleeve which constitutes the outer member of the telescopic shaft. Whether or not the male shaft member is fully engaged in the female shaft member of the telescopic shaft, the operation is exceptionally smooth. A contributing factor is the sequence of machine operations, whereby the inner shaft member, after being heat treated, is straightened and finally ground in such a way that the ball race surfaces are completely true and rectilinear longitudinally of the shaft.

The end caps may be cast in synthetic resin and require no machining. They can be held in place in any desired manner, as exemplified by split rings which are used conventionally as shown.

The operation is extremely effective despite the low cost of production.

BRIEF DESCRIPTION OF DRAWINGS

FIG. 1 is a view in axial section of a telescopic shaft structure embodying the invention, the inner member being shown in elevation and in a partially extended position.

FIG. 2 is a view taken in section on the line 2—2 of FIG. 1. Clearance is greatly exaggerated to stress the fact that in either direction of rotation the balls in one of the paired race channels move rectilinearly under torque while the balls in the other race channel of each pair are substantially free of torque pressure.

FIG. 3 is a view taken in section on the line 3—3 of FIG. 2.

FIG. 4 is a plan view of the separately fabricated end cap.

FIG. 5 is a view of the end cap in perspective.

DESCRIPTION OF PREFERRED EMBODIMENT

The extensible inner shaft member 10 is preferably square in cross section. The outer shaft member 12 is tubular. For convenience of manufacture, the sleeve portion 14 which provides the antifriction circulatory bearing system is separately fabricated and welded internally or externally at 16 to the tube 12 to become a part thereof.

The sleeve 14 has a central axial bore at 18. This is broached or otherwise machined to provide axially extending surfaces at 20 which are complementary to the polygonal cross section of the inner shaft member 10, hence having the form of the corners of an imaginary square which intersects the outline of the bore 18 which, in this particular exemplification, is circular.

Adjacent the respective corners 20 in the interior of the sleeve 14 are ball race channels 22 which extend rectilinearly opposite respective faces of member 10 from one end of the sleeve to the other. Two ball race channels opposite each such face are paired to constitute parts of a circulatory ball system. These are desirably at opposite sides of the opposing face of the inner member 10 so that, in each direction of rotation, the balls in one channel transmit the torque while the balls in the return circulation path in the other channel of each pair are free of torque.

The dimensions of the ball race channels are correlated to the dimensions of the balls 24 to be confined therein. It will be observed in FIG. 2 that the contained ball 24 projects only slightly from the race, with its outer periphery 26 engaged with a face of the inner shaft member 10. At either side of the channel where the face 26 is exposed, the sleeve has flanges 28 and 30 between which clearance is less than the diameter of the ball.

The channels are broached, leaving the projecting margins 28 and 30 unworked. Since the balls in each channel are confined by these margins, the shaft sections may readily be separated whenever desired, all balls remaining confined, so that reassembly involves no more than placing the inner shaft member into the outer shaft member.

It will further be noted that each ball race channel has an arcuate surface 32 at one side of the ball. At the opposite side of the ball, the surfaces 34 and 36 are tangential, or nearly so. These surfaces diverge from the periphery of the ball toward an apex which forms a generally triangular pocket 38 for purposes hereinafter described.

The cross sections of the respective ball races are allochiral so that the pockets 38 of the races at each side of the inner shaft member 10 project oppositely from each other and project toward the proximate channels on the next contiguous faces of the inner shaft member.

It will be understood that the described arrangement is merely by way of suggestion since a converse arrangement may be used.

In this particular embodiment, the generally cylindrical surface 18 of the central bore of the sleeve is outwardly convex with respect to each opposed planiform face 40 of the inner shaft member 10. This clearly appears in FIG. 2. As already stated, all of the ball race channels are rectilinear in their extent longitudinally of the respective shaft member 10. It is necessary, therefore, to provide means extraneous to the sleeve 14 for transferring balls from one channel to the other channel of the pair to complete each of the closed circuits in which the balls operate. This is accomplished by caps 50 as shown specifically in FIGS. 4 and 5. Each of these caps has an external periphery 52 of diameter to fit into the counter bore 54 at each end of the sleeve 14. Means such as the split ring 56 is provided to anchor each of the caps against the shoulder 57 at the end of the counter bore.

Whereas the external periphery 52 of the cap 50 is cylindrical in this embodiment, the central opening 58 of the cap, as shown in FIGS. 4 and 5, may be bordered by planiform surfaces 60 conforming to the polygonal faces of the inner shaft member 10. At the end 62 of the cap which is directed inwardly are race channels 64 which are continuous between the face channels 22 of each pair constituting a given closed circuit. One end of the channel 64 registers with one of the race channels 22 and the opposite end of the channel 64 registers with the other race channel 22 of a given circuit at one face 40 of the inner shaft member. The intermediate portion 66 of each of the channels 64 curves outwardly away from the corresponding face of the shaft member, the approximate width of the channel being maintained by an axially projecting tongue 68, what has a flat internal face 70 complementary to the corresponding face 40 of shaft member 10 and an external convex face 72 which guides each successive ball out of contact with the corresponding face 40 of the shaft member so that the ball will freely move laterally while the shaft face 40 may be moving axially and also so that the ball will not fall out when shaft is removed.

As best shown in FIG. 1 and FIG. 3 each end 76 of the sleeve 14 is square-cut at the shoulders 57 and each of the race channels 22 is rectilinear from one end to the other. As a given ball transferring from one race channel 22 to the corresponding race channel at the other side of the system is caused to traverse the arcuate channel 64 of the end cap, it remains in or reestablishes contact with the corresponding surface 40 of shaft member 10 to the extent that the ball is exposed to the shaft through one of the openings 78 at the ends of the respective race channels 64 with which the end cap is provided. As best shown in FIG. 5, these openings border the margins of the upward tongue projection 68.

Obviously, torque may be applied in either relative direction. Assuming that torque is primarily applied to the inner shaft member 10 clockwise in the direction of the arrow in FIG. 2, the balls in the races corresponding to the race 22 which is at the left in the upper part of FIG. 2, will all roll under pressure in transmitting torque to the outer sleeve 14. Balls in the race channels corresponding to the race channel which is at the right in the upper portion of FIG. 2 will be wholly relieved of pressure and free to roll on flanges 28 and 30 (substantially without resistance) to the end cap which guides their return to the pressurized channel of the pair.

At each of the corners of the central opening 58 in the end of the end cap, the end cap has axially projecting prongs 80 and 82 best shown in FIGS. 4 and 5. The respective prongs 80 are received into the above described corner pocket 38 best shown in FIG. 2. Each intermediate prong 82 is received into the corner pocket 20 as above described. Engagement of the prongs in these pockets in the angles between consecutive faces of the shaft member 10 provides dowelling which orients the end cap positively to the sleeve 14 to assure registration of each channel 64 with the race channels 22 opposite a given face of member 10.

As best shown in FIGS. 1, 4 and 5, the end cap 50 has an axial channel 83 on the inner face of a tongue 70. This tongue engages a peg 85 on the inner shaft member 10 (FIG. 1) so that the shaft members cannot be assembled otherwise than in proper orientation. This assures the proper functioning of any universal joint parts or other mechanisms requiring such orientation.

It will be observed that each race channel 64 in the end cap has a flat surface 84 to facilitate movement of successive balls into channel 64 from one of the axial races 22, and to facilitate return of successive balls from channel 64 into the other race channel 22 of the given circulatory system. The flow is very smooth and friction between the shaft members is greatly reduced by the construction disclosed.

It will be understood that the foregoing description is exemplary only. As indicated in the accompanying claims, it is contemplated that flat race surfaces and channeled race surfaces may be interchanged between the inner and outer shaft members, and other changes made while retaining the advantages of the invention.

We claim:

1. A telescopically extensible shaft having a first shaft member of polygonal cross section provided with substantially flat faces, and a second complementary shaft member having pairs of ball race channels complementary to said faces, each of said pairs consisting of two channels opposed to a single face at opposite sides thereof, the channels being substantially rectilinear in a direction axially of said second shaft member, said second shaft member being provided integrally with marginal flanges overhanging said channels and between which portions of the peripheries of balls in said channels are exposed to the exposed flat faces, said flanges being adapted to confine the balls hereinafter mentioned against loss when the shaft members are separated, and end cap means connected at opposite ends of the second shaft member and each end cap having a transverse passage spaced, in part, from the associated flat face and connecting the ends of the ball race channels of each pair in closed circuits, and balls circuitously movable through the pairs of channels and the connecting passages of the end caps to provide circulating anti-friction bearings in conjunction with said flat faces.

2. A telescopically extensible shaft in accordance with claim 1 in which the shaft member with flat faces is an inner shaft member and the shaft member provided with said channels is a sleeve, said sleeve having a seat for each end cap and means for holding each end cap to its seat, the respective end caps and the sleeve having prong and recess means for maintaining the end caps properly oriented with regard to the ball race channels of the sleeve.

3. A telescopically extensible shaft in accordance with claim 2 in which each end cap has an opening of polygonal cross section complementary to the cross section of the inner shaft member and has surfaces providing the said transverse passage and of such form that the transverse passages curve outwardly away from the inner shaft member.

4. A telescopically extensible shaft according to claim 3 in which the transverse passages of the end caps have sufficient opening at their ends to expose balls in said passages to the opposing surface of the inner shaft member, the opening having less extent than the diameter of the balls, whereby the balls are confined in said closed circuits.

5. A telescopically extensible shaft according to claim 1 in which the shaft member having substantially flat faces is an inner shaft member and the complementary shaft member is a sleeve provided with said paired channels, the inner shaft member faces aforesaid being accurately finished with bearing race surfaces in true parallelism with the direction of movement of the balls in the complementary channel.

6. A telescopically extensible shaft including an inner shaft member of polygonal cross section provided with substantially truly planiform flat faces and with corners intervening between such faces, a complementary external shaft member comprising a sleeve having a central bore and generally radial grooves enlarging said bore to receive the said corners of the inner shaft member, the said sleeve having portions complementary to several of said faces and provided opposite each of said several faces of said inner shaft member with pairs of ball race channels spaced laterally of the complementary faces, said sleeve having integral unworked marginal portions overhanging respective channels for confining the balls in the respective channels and spaced to permit peripheral portions of the balls to project from the channels into engagement with the respective complementary faces of the inner shaft member, the sleeve further having counterbores providing seats at the ends of said ball races, separately fabricated cap members disposed in the counterbores and in substantial engagement with said seats, means for holding said cap members in position in said bores, each end cap being provided with a transverse ball passage spaced, in part, from the associated flat face and communicating with spaced channels of the respective channel pairs of said sleeve, means for holding the end caps oriented with regard to the sleeve to define closed ball circuits each of which includes a pair of ball race channels in the sleeve and transverse ball passages in the respective end caps, and balls freely movable in said closed circuits through the ball races of the sleeve and the ball passages of the end caps.

7. A telescopically extensible shaft according to claim 6 in which the said grooves have a radial extent greater than that of the corners of the inner shaft member and the means for orienting the end caps includes prongs connected with the end caps and extending into portions of said grooves externally of the corners of the inner shaft member.

8. A telescopically extensible shaft according to claim 6 in which certain of the ball race channels of said sleeve comprise ball confining surfaces in substantial contact with respective balls, said sleeve including other surfaces providing sockets, the means for orienting the end caps comprising prongs extending into the respective sockets.

9. A telescopically extensible shaft according to claim 6 in which the transverse ball passages of the respective end caps are arcuately convex away from complementary surfaces of the inner shaft member whereby balls traversing the end cap ball passages transversely between the ball race channels of the sleeve are withdrawn from contact with the complementary face of the inner shaft member, the end cap having axially projecting tongues defining the sides of the end cap ball passages, said tongues being complementary to the opposing faces of the inner shaft member and having surfaces which are arcuately convex and, in part, define the ball passages.

10. A telescopically extensible shaft according to claim 6 in which the external shaft member comprises a tube to which said sleeve is connected as an extension thereof, said sleeve having a split ring retainer holding one of the end caps to one of the ends of the sleeve.

11. A telescopically extensible shaft according to claim 1 in which the first and second shaft members are respectively provided with pin and channel means for accommodating assembly only in one relative angular position.

References Cited

UNITED STATES PATENTS

| | | | |
|---|---|---|---|
| 2,908,152 | 10/1959 | Anderson | 308—6 |
| 3,304,745 | 2/1967 | King et al. | 308—6 |
| 3,356,424 | 12/1967 | Edwards | 308—6 |
| 3,318,109 | 5/1967 | Ressler et al. | 308—6 |

FOREIGN PATENTS

| | | | |
|---|---|---|---|
| 125,573 | 7/1931 | Austria | 308—6 |

FRED C. MATTERN, JR., Primary Examiner

FRANK SUSKO, Assistant Examiner